United States Patent
Inagaki et al.

(10) Patent No.: US 10,300,376 B2
(45) Date of Patent: May 28, 2019

(54) DISPLAY DEVICE, DISPLAY METHOD, AND NON-TRANSITORY STORAGE MEDIUM

(71) Applicant: JVC KENWOOD Corporation, Yokohama-shi, Kanagawa (JP)

(72) Inventors: Kazuyuki Inagaki, Yokohama (JP); Tatsushi Nakanishi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 248 days.

(21) Appl. No.: 15/297,347

(22) Filed: Oct. 19, 2016

(65) Prior Publication Data

US 2017/0274278 A1 Sep. 28, 2017

(30) Foreign Application Priority Data

Mar. 25, 2016 (JP) ................. 2016-061922

(51) Int. Cl.
| | |
|---|---|
| A63F 13/25 | (2014.01) |
| A63F 13/46 | (2014.01) |
| A63F 13/812 | (2014.01) |
| A63F 13/95 | (2014.01) |
| H04N 21/414 | (2011.01) |

(52) U.S. Cl.
CPC .............. *A63F 13/25* (2014.09); *A63F 13/46* (2014.09); *A63F 13/812* (2014.09); *A63F 13/95* (2014.09); *H04N 21/41407* (2013.01); *A63F 2300/8011* (2013.01)

(58) Field of Classification Search
None
See application file for complete search history.

(56) References Cited

U.S. PATENT DOCUMENTS

| | | | |
|---|---|---|---|
| 2005/0179201 A1* | 8/2005 | DeSalvo, Jr. ....... | A63F 3/00031 273/244.1 |
| 2014/0157195 A1* | 6/2014 | Bowman ........... | H04L 29/06027 715/810 |
| 2016/0172005 A1* | 6/2016 | Oguchi .................. | G11B 27/28 386/241 |

FOREIGN PATENT DOCUMENTS

JP      2005-236541      9/2005

\* cited by examiner

*Primary Examiner* — Eileen M Adams
(74) *Attorney, Agent, or Firm* — Amin, Turocy & Watson LLP

(57) ABSTRACT

A display device comprises a display, a storage configured to store a game video of a game of baseball captured in advance and scorebook data corresponding to the game, and a controller configured to extract from the game video, when score information of a specific player included in the scorebook data is selected, a displayed video including an at-bat video of the specific player in an at-bat related to the selected score information, and when the specific player advanced to base, also a base-running video of the specific player related to the selected score information as a runner in the at-bat to cause the display to display the displayed video.

10 Claims, 11 Drawing Sheets

FIG.3

| | PITCHING RECORD | AT-BAT RECORD | INNING | TOP/ BOTTOM | BAT-TING ORDER | PER-SONAL ID | PITCHING RESULT INFORMA-TION | ON-BASE INFOR-MATION | FIRST BASE RUNNER (PERSONAL ID) | SECOND BASE RUNNER (PERSONAL ID) | THIRD BASE RUNNER (PERSONAL ID) | START TAG | END TAG |
|---|---|---|---|---|---|---|---|---|---|---|---|---|---|
| | | | | | | | | | BATTER SCORE INFORMATION | RUNNER SCORE INFORMATION | | TAG DATA | |
| R2 | A005 | D005 | 2 | TOP | 5 | 005 | BALL | | (0) | (0) | (0) | TA0015 | TB0015 |
| R2 | A006 | D005 | 2 | TOP | 5 | 005 | SWING AND MISS | | (0) | (0) | (0) | TA0016 | TB0016 |
| R2 | A007 | D005 | 2 | TOP | 5 | 005 | STRIKE | | (0) | (0) | (0) | TA0017 | TB0017 |
| R2 | A008 | D005 | 2 | TOP | 5 | 005 | SINGLE | 1 | (0) | (0) | (0) | TA0018 | TB0018 |
| | A009 | D006 | 2 | TOP | 6 | 006 | BALL | | (005) | (0) | (0) | TA0019 | TB0019 |
| | A010 | D006 | 2 | TOP | 6 | 006 | FOUL | | (005) | (0) | (0) | TA0020 | TB0020 |
| R2 / R1 | A011 | D006 | 2 | TOP | 6 | 006 | SINGLE | 1 | SECOND BASE (005) | (0) | (0) | TA0021 | TB0021 |
| R2 | A012 | D007 | 2 | TOP | 7 | 007 | SINGLE | 1 | SECOND BASE (006) | THIRD BASE (005) | (0) | TA0022 | TB0022 |
| | A013 | D008 | 2 | TOP | 8 | 008 | FOUL | | (007) | (006) | (005) | TA0023 | TB0023 |
| | A014 | D008 | 2 | TOP | 8 | 008 | STRIKE | | (007) | (006) | (005) | TA0024 | TB0024 |
| | A015 | D008 | 2 | TOP | 8 | 008 | STRIKEOUT | 0 | (007) | (006) | (005) | TA0025 | TB0025 |
| | A016 | D009 | 2 | TOP | 9 | 009 | SWING AND MISS | | (007) | (006) | (005) | TA0026 | TB0026 |
| | A017 | D009 | 2 | TOP | 9 | 009 | STRIKE | | (007) | (006) | (005) | TA0027 | TB0027 |
| R2 | A018 | D009 | 2 | TOP | 9 | 009 | SINGLE | 1 | SECOND BASE (007) | HOME BASE (006) | HOME BASE (005) | TA0028 | TB0028 |
| | A019 | D010 | 2 | TOP | 1 | 001 | GROUND OUT TO SECOND | 0 | (009) | (007) | (0) | TA0029 | TB0029 |
| | A020 | D011 | 2 | TOP | 2 | 002 | SINGLE | 1 | SECOND BASE (009) | THIRD BASE (007) | (0) | TA0030 | TB0030 |
| | A021 | D012 | 2 | TOP | 3 | 003 | BALL | | (002) | (009) | (007) | TA0031 | TB0031 |
| | A022 | D012 | 2 | TOP | 3 | 003 | BALL | | (002) | (009) | (007) | TA0032 | TB0032 |
| | A023 | D012 | 2 | TOP | 3 | 003 | STRIKE | | (002) | (009) | (007) | TA0033 | TB0033 |
| | A024 | D012 | 2 | TOP | 3 | 003 | FOUL | | (002) | (009) | (007) | TA0034 | TB0034 |
| | A025 | D012 | 2 | TOP | 3 | 003 | FLY OUT TO RIGHT | 0 | (002) | (009) | (009) | TA0035 | TB0035 |
| | A026 | D013 | 2 | BOTTOM | 6 | 016 | STRIKE | | (0) | (0) | (0) | TA0036 | TB0036 |

FIG.4

| TAG DATA | TIME DATA |
|---|---|
| TA0015 | 0:03:05 |
| TB0015 | 0:03:12 |
| TA0016 | 0:03:21 |
| TB0016 | 0:03:27 |
| TA0017 | 0:03:55 |
| TA0017 | 0:04:02 |
| ⋮ | ⋮ |
| TA0035 | 0:21:20 |
| ⋮ | ⋮ |

DISPLAY DEVICE, DISPLAY METHOD, AND NON-TRANSITORY STORAGE MEDIUM

CROSS-REFERENCE TO RELATED APPLICATIONS

The present application claims priority to and incorporates by reference the entire contents of Japanese Patent Application No. 2016-061922 filed in Japan on Mar. 25, 2016.

FIELD

The present disclosure relates to a display device, a display method, and a non-transitory storage medium.

BACKGROUND

There is known a display technology which enables score information of a scorebook to be displayed together with a baseball game video, and which enables viewing of a game while looking at the score information (for example, see JP 2005-236541 A).

For example, in a baseball game, when focusing on play of a specific player in an inning, the specific player acts as a batter at-bat, and after advancing to a base in the at-bat, the specific player acts as a runner. The play as a batter at bat and the play as a runner on base are both written in a scorebook. However, with the display technology disclosed in JP 2005-236541 A, score information about a batting result is displayed according to an event that is displayed in a display or the like, but score information about base-running after advancing to a base is not displayed. Accordingly, JP 2005-236541 A displays the play of a specific player as a batter, but does not display the following play of the specific player as a runner. Therefore, for example, display focusing on play of a specific player from start of at-bat to the end of base-running cannot be performed.

SUMMARY

It is an object of the present disclosure to at least partially solve the problems in the conventional technology.

According to one embodiment of the present disclosure, there is provided a display device comprising a display, a storage configured to store a game video of a game of baseball captured in advance and scorebook data corresponding to the game, and a controller configured to extract from the game video, when score information of a specific player included in the scorebook data is selected, a displayed video including an at-bat video of the specific player in an at-bat related to the selected score information, and when the specific player advanced to base, also a base-running video of the specific player related to the selected score information as a runner in the at-bat to cause the display to display the displayed video.

According to one embodiment of the present disclosure, there is provided a display method for causing a display device, including a display and a storage configured to store a game video of a game of baseball captured in advance and scorebook data corresponding to the game, to display a displayed video, the display method comprising extracting from the game video, when score information of a specific player included in the scorebook data is selected, the displayed video including an at-bat video of the specific player in an at-bat related to the selected score information, and when the specific player advanced to base, also a base-running video of the specific player related to the selected score information as a runner in the at-bat, and causing the display to display the displayed video.

According to one embodiment of the present disclosure, there is provided a non-transitory storage medium which stores a display program for causing a display device, including a display and a storage configured to store a game video of a game of baseball captured in advance and scorebook data corresponding to the game, to display a displayed video, the display program being configured to cause the display device to perform processes of extracting from the game video, when score information of a specific player included in the scorebook data is selected, the displayed video including an at-bat video of the specific player in an at-bat related to the selected score information, and when the specific player advanced to base, also a base-running video of the specific player related to the selected score information as a runner in the at-bat, and causing the display to display the displayed video.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3 is a diagram illustrating an example of scorebook data that is stored in a scorebook data storage unit;

FIG. 4 is a diagram illustrating an example of synchronization information that is stored in a synchronization data storage unit;

DETAILED DESCRIPTION OF THE PREFERRED EMBODIMENTS

Hereinafter, an embodiment of a display device, a display method, and a non-transitory storage medium which stores a display program according to the present disclosure will be described with reference to the drawings. Additionally, the present disclosure is not to be limited by this embodiment. Also, structural elements in the following embodiment include elements that are easily replaceable by those skilled in the art or elements that are substantially the same.

Figure 1:
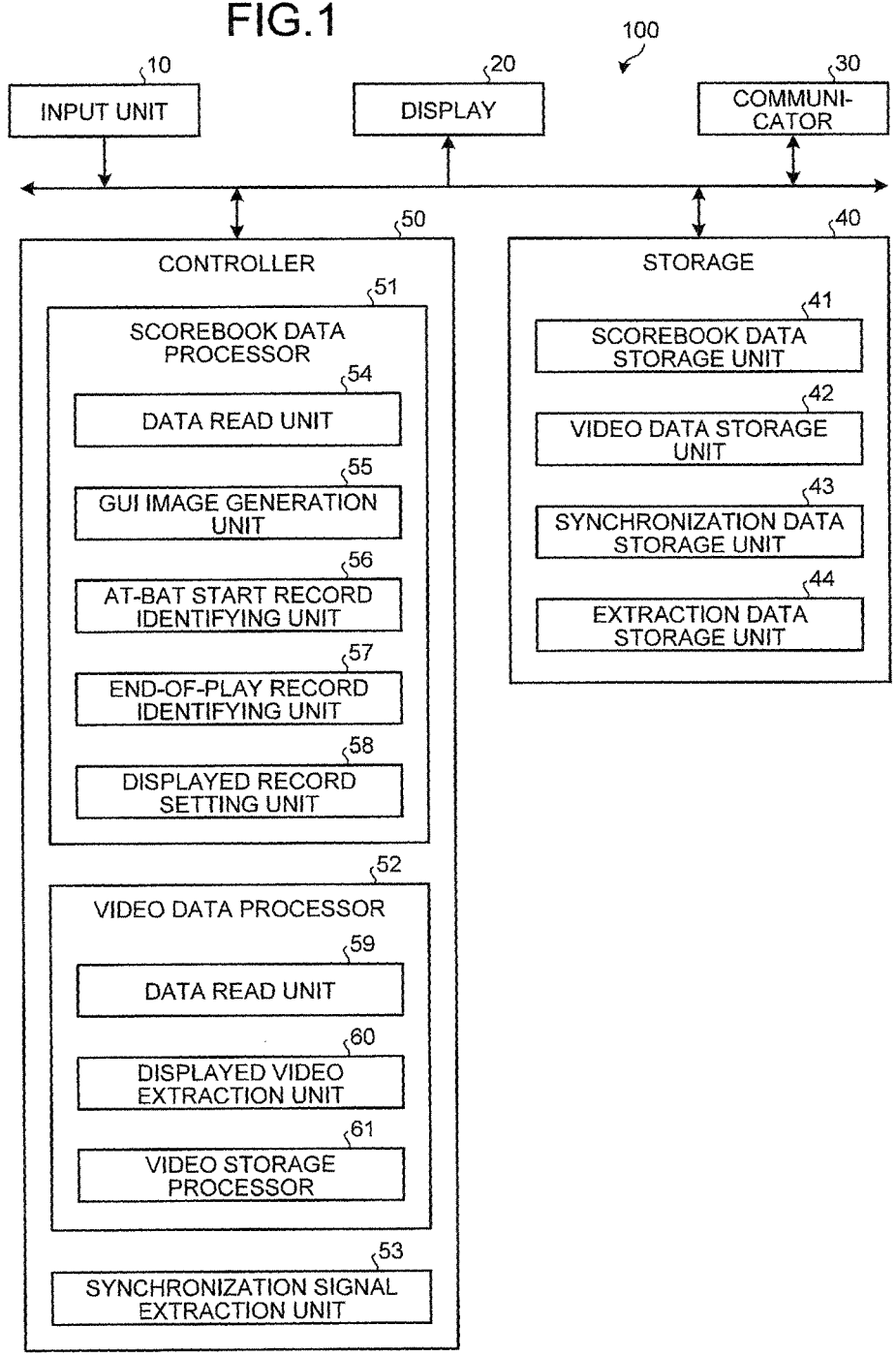
FIG. 1 is a block diagram illustrating an example of a display device according to a present embodiment.

FIG. 1 is a block diagram illustrating an example of a display device 100 according to the present embodiment.

The display device 100 illustrated in FIG. 1 displays a baseball game video based on video data of a game of baseball which is captured in advance, for example. As illustrated in FIG. 1, the display device 100 includes an input unit 10, a display 20, a communicator 30, a storage 40, and a controller 50. The input unit 10, the display 20, the communicator 30, the storage 40, and the controller 50 are connected by a bus line, for example.

The input unit 10 outputs an command signal to the controller 50. As the input unit 10, an input device such as a touch panel is used, for example. Additionally, as the input unit 10, a button, a lever, a dial, a switch or another input device may be used in addition to or instead of the touch panel. The input unit 10 outputs an command signal according to a predetermined input operation. The display 20 displays various pieces of information including texts and images. The display 20 includes a display panel, such as a liquid crystal panel. The display 20 is capable of displaying information including videos.

Figure 2:
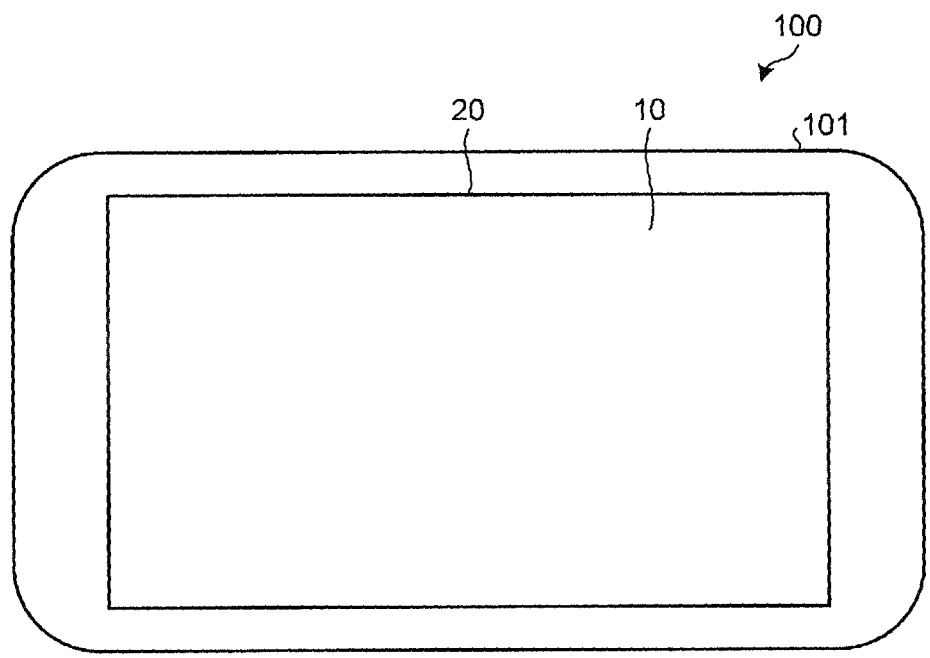
FIG. 2 is a diagram illustrating an example of the display device according to the present embodiment.

FIG. 2 is a diagram illustrating an example of the display device 100 according to the present embodiment. As illustrated in FIG. 2, the display device 100 includes a housing 101 of a mobile terminal type, for example. The input unit 10 and the display 20 are provided on a surface of the housing 101. Additionally, the communicator 30, the storage 40, and the controller 50 are provided inside the housing 101.

As illustrated in FIG. 2, as the input unit 10 and the display 20, a touch panel, which is the input unit 10, is disposed, overlapping a display panel, which is the display 20. The display 20 is capable of displaying an image for operation. When a touch operation is performed on a area of the touch panel, overlapping the image for operation, the input unit 10 outputs a predetermined command signal. Additionally, the structures of the input unit 10 and the display 20 are not limited to the structures described above.

As illustrated in FIG. 1, the communicator 30 performs communication of information with an external appliance in a wired or wireless manner. For example, the communicator 30 exchanges video data or the like with an external image capturing device. Additionally, the display device 100 may be provided with an image capturing device.

The storage 40 includes storage such as a hard disk drive or a solid state drive. Additionally, an external storage medium, such as a removable disk, may also be used as the storage 40. The storage 40 stores an operating system of the display device 100, various programs for controlling the operations of the input unit 10, the display 20, and the communicator 30, data, and the like.

Furthermore, the storage 40 includes a scorebook data storage unit 41, a video data storage unit 42, a synchronization data storage unit 43, and an extraction data storage unit 44.

The scorebook data storage unit 41 stores scorebook data of a baseball game. The scorebook data includes data of scores written in a baseball scorebook. Scores to be recorded in a scorebook will be briefly described. The scores are aggregations of score information. The score information is an individual event which occurs due to each pitch of a pitcher. Accordingly, a plurality of pieces of score information is created every time a pitcher throws a ball, and thereby one score is created. For example, if a batting result with a runner on first base is fly out to right and the first base runner is tagged out, score information that the batter is out, score information about fly out to right, and score information that the first base runner was tagged out are created, and one score is configured by such score information.

Besides the score information above, the score may include an action of a batter, an action of a fielder, determination of a count, state of advancement of a runner when there is already a runner on base, other play of batters and fielders, and the like. Specifically, the score may include score information such as a strike, a ball, a foul, batting result, type of a batted ball, a catching fielder, advancement result, and the like. The score information of the batting result is information such as an out, a single hit, a two-base hit, a three-base hit, a homerun, and the like. The type of a batted ball is information such as a ground ball, a line drive, a fly, a bunt, and the like, but may be categorized into more types. A catching fielder is information for identifying a fielder who has actually caught the ball or the position of the fielder. The advancement result is information about advancement of a runner on base, such as "from first base to second base", but other play and the like of batters and fielders may also be included.

FIG. 3 is a diagram illustrating an example of the scorebook data that is stored in the scorebook data storage unit 41. In the example illustrated in FIG. 3, all the pieces of score information for the top of second inning and one piece of score information for the bottom of second inning are illustrated. As illustrated in FIG. 3, the scorebook data includes batter score information 71, runner score information 72, and tag data 73. The batter score information 71 includes pitching record 74, at-bat record 75, inning information 76, top/bottom information 77, batting order information 78, a personal ID 79, pitching result information 80, and on-base information 81.

One pitching record 74 is created every time a pitcher throws a ball. As an index, a pitching record number is assigned to the pitching record 74 in the ascending order of the pitching. One at-bat record 75 is created every time one at-bat ends, that is, every time a score is determined. One or a plurality of pitching records is included in one at-bat record. In the at-bat record 75, an at-bat record number is assigned, as an index, to one at-bat in the ascending order.

The inning information 76 is information indicating an inning number at which the pitching record 74 and the at-bat record 75 are created. The top/bottom information 77 is information indicating top or bottom of an inning. The batting order information 78 is information indicating the batting order in one score, and is represented by an integer between 1 and 9, for example. The personal ID 79 is information for identifying a batter in one score. The personal ID 79 is associated with information such as a name of the corresponding player by a table or the like, not illustrated.

The pitching result information 80 is information indicating a result for one pitching record 74. The pitching result information for the last pitch in one at-bat corresponds to the batting result in the at-bat. The on-base information 81 is information indicating an on-base status in one at-bat. The on-base information 81 is expressed by an integer of 0 or 1, for example. When the on-base information 81 is 0, it is indicated that the batter did not advance to a base in one at-bat. When the on-base information 81 is 1, it is indicated that the batter advanced to a base in one at-bat.

As illustrated in FIG. 3, for example, an at-bat record with the at-bat record number is D005 includes four pitching records (pitching record numbers: A005 to A008) in the score of a batter (personal ID: 005). The pitching result information 80 for the pitching record A005 for the first pitch is a ball. Also, the pitching result information 80 for the pitching record A006 for the second pitch is a swing and miss. Also, the pitching result information 80 for the pitching record A007 for the third pitch is a strike. Moreover, the pitching result information 80 for the pitching record A008 for the fourth pitch is a single hit. Accordingly, in the pitching record A008 for the fourth pitch, the on-base information 81 is "1".

Also, the next at-bat record (at-bat record number: D006) includes three pitching records (pitching record numbers: A009 to A011) in the score of a batter (personal ID: 006). The pitching result information 80 for the pitching record A009 for the first pitch is a ball. Also, the pitching result information 80 for the pitching record A010 for the second pitch is a foul. Moreover, the pitching result information 80 for the pitching record A011 for the third pitch is a single hit. Accordingly, in the pitching record A011 for the third pitch, the on-base information 81 is "1".

Furthermore, the batter score information 71 corresponds to score information such as an action of a batter, an action of a fielder, determination of a count, other play of a batter and a fielder, and the like in the score information described above. The score information of other play and the like indicates irregular events which should be preferably recorded separately from regular scores, such as an interference, an uncaught strike, a balk, and the like.

The runner score information 72 is score information relating to an advancement result among the score information described above. The runner score information 72 includes first base runner information 82, second base runner information 83, and third base runner information 84. The first base runner information 82, the second base runner information 83, and the third base runner information 84 are created for each pitching record 74. In FIG. 3, each of the first base runner information 82, the-second base runner information 83, and the third base runner information 84, as illustrated on the upper side of each section, includes information representing a base up to which the runner advances for a corresponding pitching record. A display "second base" indicates that a runner has advanced to second base. A display "third base" indicates that a runner has advanced to third base. A display "home base" indicates that a runner has advanced to home base. A display "out" indicates that the runner is put out during base-running. A display "1" indicates that a runner is left on base. Furthermore, as indicated in the bottom side in each section, each of the first base runner information 82, the second base runner information 83, and the third base runner information 84, as illustrated on the lower side of each section, includes a personal ID for identifying a runner on the corresponding base.

As illustrated in FIG. 3, for example, a player 005 is recorded as the first base runner information in the pitching record A009 of the at-bat record D006. This first base runner is the player 005 who hit a single in the previous at-bat (at-bat record D005) and advanced to first base. Furthermore, in the pitching record A011 of the at-bat record D006, "second base" is recorded together with the record of the player 005 in the first base runner information. This record indicates that the player 005 on first base advanced to second base at the pitching of the pitching record A011. Additionally, in the pitching record A011, the pitching result information for a player 006 as a batter is a single hit, and the player advanced to first base. Accordingly, it is indicated by the pitching record A011 that the player 006 as a batter hit a single and advanced to first base, and that the player 005 on first base advanced to second base. In this manner, when one player advances to a base in at-bat, result of play of another player as a runner is also recorded in the pitching record at the last at-bat.

The tag data 73 is information for identifying the score information that is created for each pitching record 74. One piece of tag data 73 is created every time the pitching record 74 is created. The tag data 73 includes a start tag 85 and an end tag 86. One start tag 85 and one end tag 86 are created every time the pitching record 74 is created. The start tag 85 identifies a start of pitching. The end tag 86 identifies an end of pitching. In this manner, the start and the end of pitching can be identified in one pitching record by the start tag 85 and the end tag 86. A tag number (TA0015, TA0016, etc.) is assigned as an index to the start tag 85 in an ascending order. In the same manner, a tag number (TB0015, TB0016, etc.) is assigned as an index to the end tag 86 in the ascending order.

The video data storage unit 42 stores video data. The video data includes data of the video of a game corresponding to the scorebook data that is stored in the scorebook data storage 41. The game video is constituted from a plurality of scenes with a pitch as a starting point. The video data is associated with time data. The time data may be time of capturing of the game video, or elapsed time from the start of capturing of the game video, for example. The video data storage unit 42 is capable of storing a plurality of pieces of video data.

The synchronization data storage unit 43 stores synchronization information. FIG. 4 is a diagram illustrating an example of the synchronization information that is stored in the synchronization data storage unit 43. As illustrated in FIG. 4, the synchronization information is information for associating the video data and the scorebook data with each other. The synchronization information includes tag data 87 and time data 88. The tag data 87 is information corresponding to the tag data 73 that is stored in the scorebook data storage unit 41. In the tag data 87, a tag number (TA0015, TB0015, TA0016, TB0016, etc.) is assigned as an index to each tag in an ascending order. Tags in the tag data 73 and the tag data 87 which are assigned with the same tag number are associated with each other, for example. Furthermore, the time data 88 is information corresponding to the time of the video data that is stored in the video data storage unit 42. The score information of one pitching in the scorebook data and the time of the game video in the video data are associated with each other by the tag data 87 and the time data 88, which are the synchronization data. For example, start time of one scene in the game video corresponds to the time of the start tag 85 in the tag data 73. Also, end time of one scene in the game video corresponds to the time of the end tag 86 in the tag data 73.

Furthermore, the storage 40 stores a display program for causing the display device 100 to perform display of the game video. When score information of a specific player in the scorebook data is selected, the display program causes the display device 100 to perform a process of extracting a displayed video from the game video which comprises an at-bat video of the specific player related to the selected score information and also a base-running video of the specific player related to the selected score information when the specific player advanced to a base as a runner, and to display the displayed video on the display 20.

The controller 50 illustrated in FIG. 1 controls each of the input unit 10, the display 20, and the communicator 30. Also, the controller 50 performs arithmetic operation, processing and the like according to command signals from the input unit 10. The controller 50 includes a processing device such as a CPU (Central Processing Unit), and a storage device such as a RAM (Random Access Memory), a ROM (Read Only Memory) and the like. The controller 50 includes a scorebook data processor 51, a video data processor 52, and a synchronization signal extraction unit 53.

The scorebook data processor 51 includes a data read unit 54, a GUI image generation unit 55, an at-bat start record identifying unit 56, an end-of-play record identifying unit 57, and a displayed record setting unit 58. The video data processor 52 includes a data read unit 59, a displayed video extraction unit 60, and a video storage processor 61.

Figure 5:
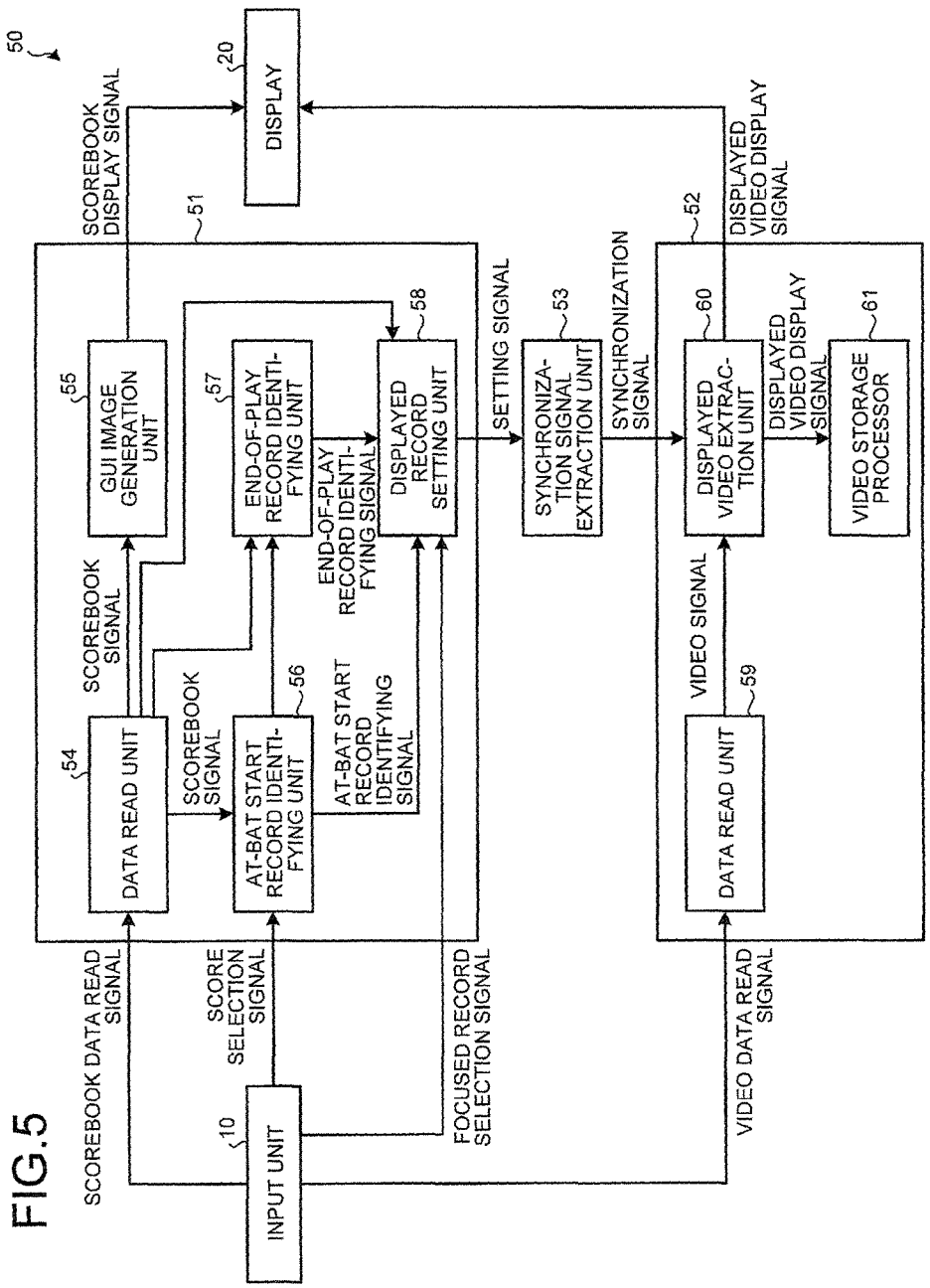
FIG. 5 is a block diagram illustrating an example of a controller.

FIG. 5 is a block diagram illustrating an example of the controller 50. FIG. 5 also illustrates flow of signals at respective units in the controller 50. As illustrated in FIG. 5, a scorebook data read signal is input to the data read unit 54. The scorebook data read signal is a signal that is input from the input unit 10, for example. The scorebook data read signal is output from the input unit 10 when an operation is performed at the input unit 10 to cause the display 20 to display the displayed video described above. Additionally, the scorebook data read signal is not limited to be input from the input unit 10. For example, the CPU or the like may input the scorebook read signal to the data read unit 54 according to a display program when the display program for causing the display 20 to display the displayed video is activated.

When the scorebook data read signal is input, the data read unit 54 reads the scorebook data stored in the scorebook data storage 41, and outputs a signal as a scorebook signal to the GUI image generation unit 55, the at-bat start record identifying unit 56, the end-of-play record identifying unit 57, and the displayed record setting unit 58. Additionally, the data read unit 54 may cause the RAM or the like of the controller 50 to store the scorebook data. In this case, the GUI image generation unit 55, the at-bat start record identifying unit 56, the end-of-play record identifying unit 57, and the displayed record setting unit 58 read the scorebook data from the RAM as the input scorebook signal.

The scorebook signal is input to the GUI image generation unit 55. When the scorebook signal is input, the GUI image generation unit 55 generates an electronic scorebook based on the scorebook data. The electronic scorebook is image data for causing the display 20 to display the score information included in the scorebook data in the form of a scorebook. When the electronic scorebook is generated, the GUI image generation unit 55 outputs the electronic scorebook to the display 20 as a scorebook display signal.

The scorebook signal and a score selection signal are input to the at-bat start record identifying unit 56. The score selection signal is a signal that is output from the input unit 10. The score selection signal is output when a touch operation is performed on an area of the touch panel on which the score information of the electronic scorebook is displayed on the display 20. The score selection signal is a signal notifying the controller 50 that the score information displayed on the touched area of the touch panel is selected. When the score selection signal is input, the at-bat start record identifying unit 56 identifies the first pitching record for the at-bat corresponding to the selected score information as an at-bat start record, based on the scorebook data. The at-bat start record identifying unit 56 outputs the identified at-bat start record as an at-bat start record identifying signal to the end-of-play record identifying unit 57 and the displayed record setting unit 58.

The scorebook signal and the at-bat start record identifying signal are input to the end-of-play record identifying unit 57. When the at-bat start record identifying signal is input, the end-of-play record identifying unit 57 identifies the pitching record at which the play of a specific player after the at-bat start record ends as an end-of-play record, based on the scorebook data. Here, the play of the specific player after the at-bat start record includes the play as a batter at bat and also the play as a runner if the specific player advances to a base in the at-bat. Accordingly, if the specific player does not advance to a base in the at-bat, the end-of-play record corresponds to the pitching record at the end of the at-bat. When the specific player advances to a base in the at-bat, the end-of-play record corresponds to the pitching record at the end of base-running. Base-running ends in a case where the runner advances to home base, in a case where the runner is put out during base-running, or in a case where the runner is left on base. Accordingly, when the specific player advances to a base in the at-bat, the end-of-play record corresponds to the pitching record of one of the three cases. The end-of-play record identifying unit 57 outputs the end-of-play record that is identified to the displayed record setting unit 58 as an end-of-play record identifying signal.

The scorebook signal, the at-bat start record identifying signal, the end-of-play record identifying signal, and a focused record selection signal are input to the displayed record setting unit 58. When the at-bat start record identifying signal and the end-of-play record identifying signal are input, the displayed record setting unit 58 sets the start of the at-bat start record to the end of the end-of-play record as a displayed record based on the scorebook data.

Furthermore, when the focused record selection signal is input, the displayed record setting unit 58 identifies a focused record based on the scorebook data, and sets the identified focused record as a displayed record. The focused record includes all the pitching records for an at-bat, among the pitching records from the at-bat start record to the end-of-play record, and when the specific player advanced to a base in the at-bat, the pitching record at the time when the score information of the specific player as a runner is changed is included. The focused record selection signal is a signal that is output from the input unit 10, for example. The focused record section signal is output from the input unit 10 when an operation for displaying the focused record is performed at the input unit 10. Also, when an operation for not displaying the focused record is performed at the input unit 10, a command signal not to select the focused record is output from the input unit 10. In this case, for example, after the at-bat start record and the end-of-play record are identified, the displayed record setting unit 58 may cause the display 20 to display an operation screen for allowing an input at the input unit 10 with respect to whether the focused record is to be displayed or not. Additionally, the focused record selection signal is not limited to be input from the input unit 10. For example, when setting is performed in advance for the focused record to be selected, the CPU or the like may input the focused record selection signal to the displayed record setting unit 58 according to the display program. After setting a displayed record, the displayed record setting unit 58 outputs a setting signal to the synchronization signal extraction unit 53.

The setting signal is input to the synchronization signal extraction unit 53. When the setting signal is input, the synchronization signal extraction unit 53 reads the synchronization data that is stored in the synchronization data storage unit 43. The synchronization signal extraction unit 53 compares the tag data 87 of the synchronization data that is read and the tag data 73 of the displayed record that is set. The synchronization signal extraction unit 53 extracts, as the start time, the time corresponding to the start tag 85 of the first pitching record that is included in the displayed record. Also, the synchronization signal extraction unit 53 extracts, as the end time, the time corresponding to the end tag 86 of the last pitching record that is included in the displayed record. When there are a plurality of displayed records, such as in a case where a plurality of focused records are set, the synchronization signal extraction unit 53 extracts the start time and the end time for each displayed record. The synchronization signal extraction unit 53 outputs the extracted start time and end time as a synchronization signal to the displayed video extraction unit 60 of the video data processor 52.

A video data read signal that is output from the input unit 10 is input to the data read unit 59. For example, the video data read signal is a signal that is output from the input unit 10. The video data read signal is output from the input unit 10 when an operation for performing a process for causing the display 20 to display the displayed video is performed at the input unit 10. Additionally, the video data read signal is not limited to be input from the input unit 10. For example, the CPU or the like may input the video data read signal to the data read unit 59 according to a display program when the display program for causing the display 20 to display the displayed video is activated. When the video data read signal is input, the data read unit 59 reads the video data that is stored in the video data storage unit 42, and outputs the video data as a video signal to the displayed video extraction unit 60.

The video signal and the synchronization signal are input to the displayed video extraction unit 60. When the synchronization signal is input, the displayed video extraction unit 60 compares the start time and the end time against the time associated with the video data, and extracts a scene, in the game video, from the start time to the end time as the displayed video. In this case, the displayed video extraction unit 60 extracts, as an at-bat video, the start of the first scene of an at-bat to the end of the last scene of the at-bat if a specific player did not advance to a base, for example. Also, when the specific player advanced to a base, the displayed video extraction unit 60 extracts, as a base-running video, the scene after the specific player advancing to a base to the end of the scene of ending of base-running of the specific player. The displayed video extraction unit 60 extracts a displayed video by extracting the at-bat video and the base-running video. When the displayed video is extracted, the displayed video extraction unit 60 outputs the displayed video to the display 20 as a displayed video display signal. Additionally, the displayed video extraction unit 60 may output the displayed video display signal to the video storage processor 61 depending on an input from the input unit 10 or on a predetermined control content.

The displayed video display signal is input to the video storage processor 61. When the displayed video display signal is input, the video storage processor 61 stores the displayed video in the extraction data storage unit 44.

Figure 11:
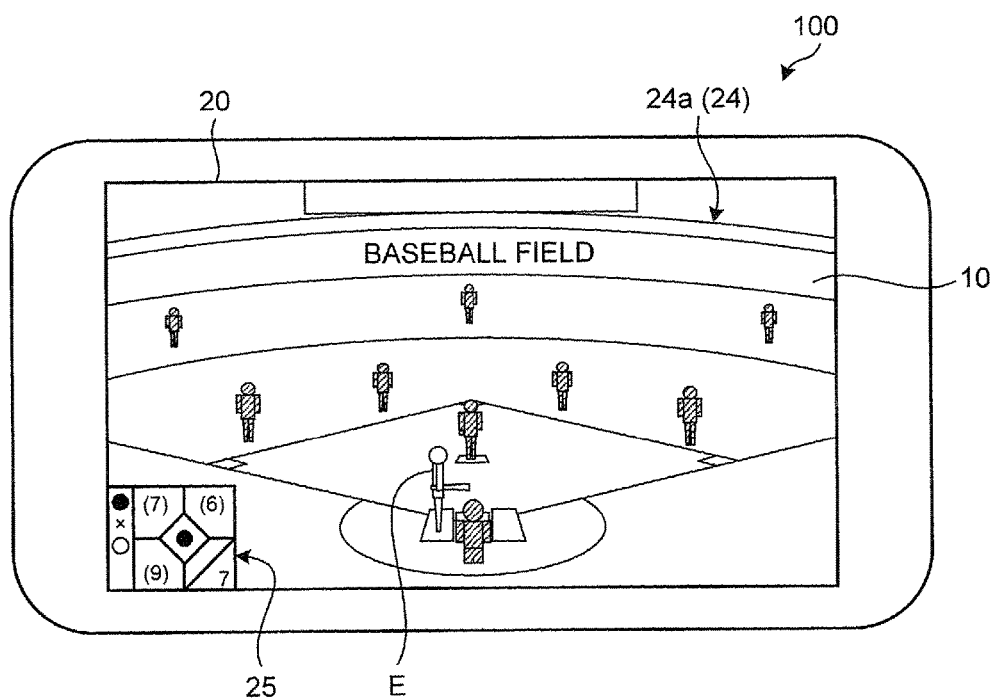
FIG. 11 is a diagram illustrating display contents of the display of the display device.
Figure 12:
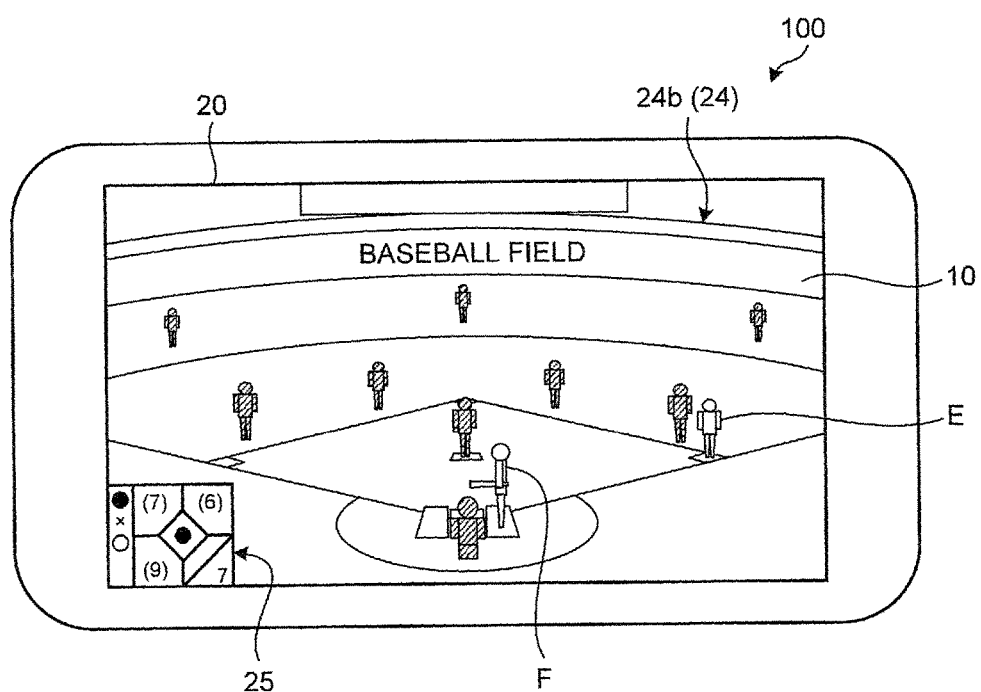
FIG. 12 is a diagram illustrating display contents of the display of the display device.

Next, an operation of the display device 100 for causing the display 20 to display a displayed video will be described with reference to FIGS. 6 to 12. FIGS. 6 to 9 are flow charts illustrating an example of an operation of the display device 100 according to the present embodiment. Also, FIGS. 10 to 12 are diagrams illustrating display contents of the display 20 of the display device 100.

Figure 6:
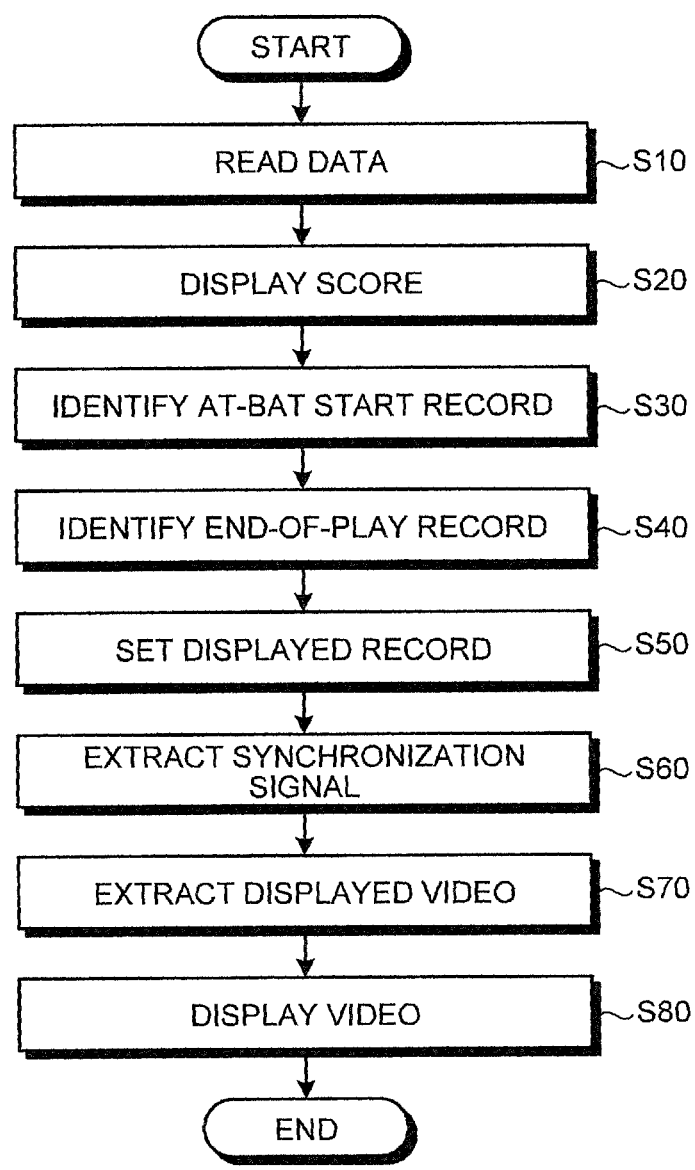
FIG. 6 is a flow chart illustrating an operation of the display device according to the present embodiment.

FIG. 6 is a flow chart illustrating a flow of an operation for causing the display 20 to display a displayed video. As illustrated in FIG. 6, first, when a scorebook data read signal is input from the input unit 10, the CPU or the like, the data read unit 54 reads the scorebook data that is stored in the scorebook data storage unit 41, and outputs a scorebook signal to the GUI image generation unit 55, the at-bat start record identifying unit 56, the end-of-play record identifying unit 57, and the displayed record setting unit 58 (step S10). Also, when a video data read signal is input from the input unit 10, the CPU or the like, the data read unit 59 reads the video data that is stored in the video data storage unit 42, and outputs a video signal to the displayed video extraction unit 60 (step S10).

When the scorebook signal is input, the GUI image generation unit 55 generates an electronic scorebook, and outputs a scorebook display signal to the display 20 (step S20). As illustrated in FIG. 10, for example, an electronic scorebook 21 is displayed on the display 20 by step S20.

Figure 10:
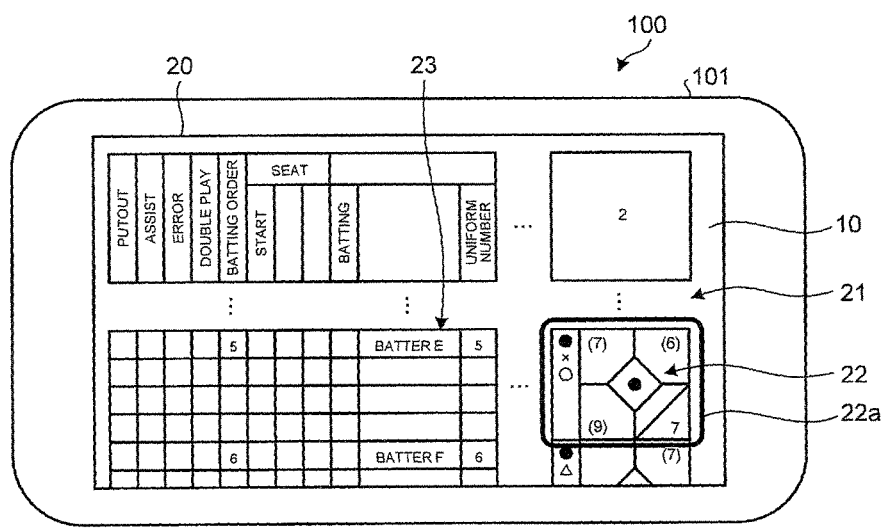
FIG. 10 is a diagram illustrating display contents of a display of the display device.

In the example illustrated in FIG. 10, a score card 22 and at-bat information 23 of the electronic scorebook 21 are displayed on the display 20. The score card 22 indicates a score for one at-bat corresponding to the at-bat information 23. In FIG. 10, the score card 22 surrounded by a rectangular frame portion 22a indicates the score information of the at-bat record D005 for the player 005 illustrated in FIG. 3, and the score information for base-running after the at-bat. In FIG. 10, a part of the electronic scorebook 21 is displayed on the display 20, but it is also possible to scroll the display contents of the electronic scorebook 21 by performing a predetermined operation on the input unit 10. Additionally, the frame portion 22a does not have to be displayed.

Figure 7:
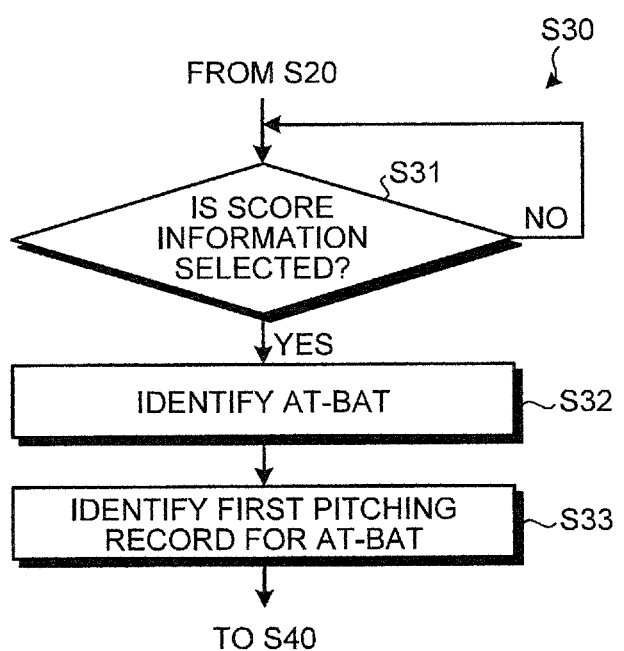
FIG. 7 is a flow chart illustrating an operation of the display device according to the present embodiment.

After the electronic scorebook 21 is displayed on the display 20, the at-bat start record identifying unit 56 identifies the at-bat start record by selection of score information by a user (FIG. 6, step S30). FIG. 7 is a flow chart illustrating procedure of processing by the at-bat start record identifying unit 56 in step S30. As illustrated in FIG. 7, in step S30, the at-bat start record identifying unit 56 determines whether score information is selected or not (step S31). In step S31, the at-bat start record identifying unit 56 determines that score information is selected when a score selection signal is input from the input unit 10. Also, when a score selection signal is not input from the input unit 10, the at-bat start record identifying unit 56 determines that score information is not selected. For example, in step S31, when a touch operation is performed on an area on which the score card 22 is superimposed in a state where the electronic scorebook 21 is displayed on the display 20 as illustrated in FIG. 10, the input unit 10 outputs a score selection signal indicating that the score card 22 is selected. Additionally, when a touch operation is performed on an area on which the at-bat information 23 is superimposed in FIG. 10, the same score selection signal as the score selection signal which is output when the score card 22 corresponding to the at-bat information 23 is selected may be output. In the example illustrated in FIG. 10, one score card 22 is displayed in association with one piece of the at-bat information 23. Accordingly, for example, when the same player has a plurality of at-bats in one inning by batting around, the at-bat information 23 for each at-bat is separately displayed, and one corresponding score card 22 is displayed for one piece of the at-bat information 23. Accordingly, the user is enabled to select the score cards 22 or the pieces of at-bat information 23 for the same player without confusion.

In the case where a score selection signal is not input in step S31 (No in step S31), the at-bat start record identifying unit 56 keeps on performing determination in step S31 until a score selection signal is input. When a score selection signal is input in step S31 (Yes in step S31), the at-bat start record identifying unit 56 identifies the at-bat corresponding to the selected score information, based on the scorebook data (step S32). Then, the at-bat start record identifying unit 56 identifies the first pitching record for the identified at-bat as the at-bat start record (step S33), and outputs an at-bat start record identifying signal to the end-of-play record identifying unit 57 and the displayed record setting unit 58.

For example, when the score card 22 surrounded by the frame portion 22a in FIG. 10 is selected in step S31, the at-bat start record identifying unit 56 identifies, in step S32, the at-bat record D005 of the player 005 illustrated in FIG. 3 as the at-bat record of a specific player. In this case, the at-bat start record identifying unit 56 identifies, in step S33, the first pitching record A005 of the at-bat record D005 as the at-bat start record.

Figure 8:
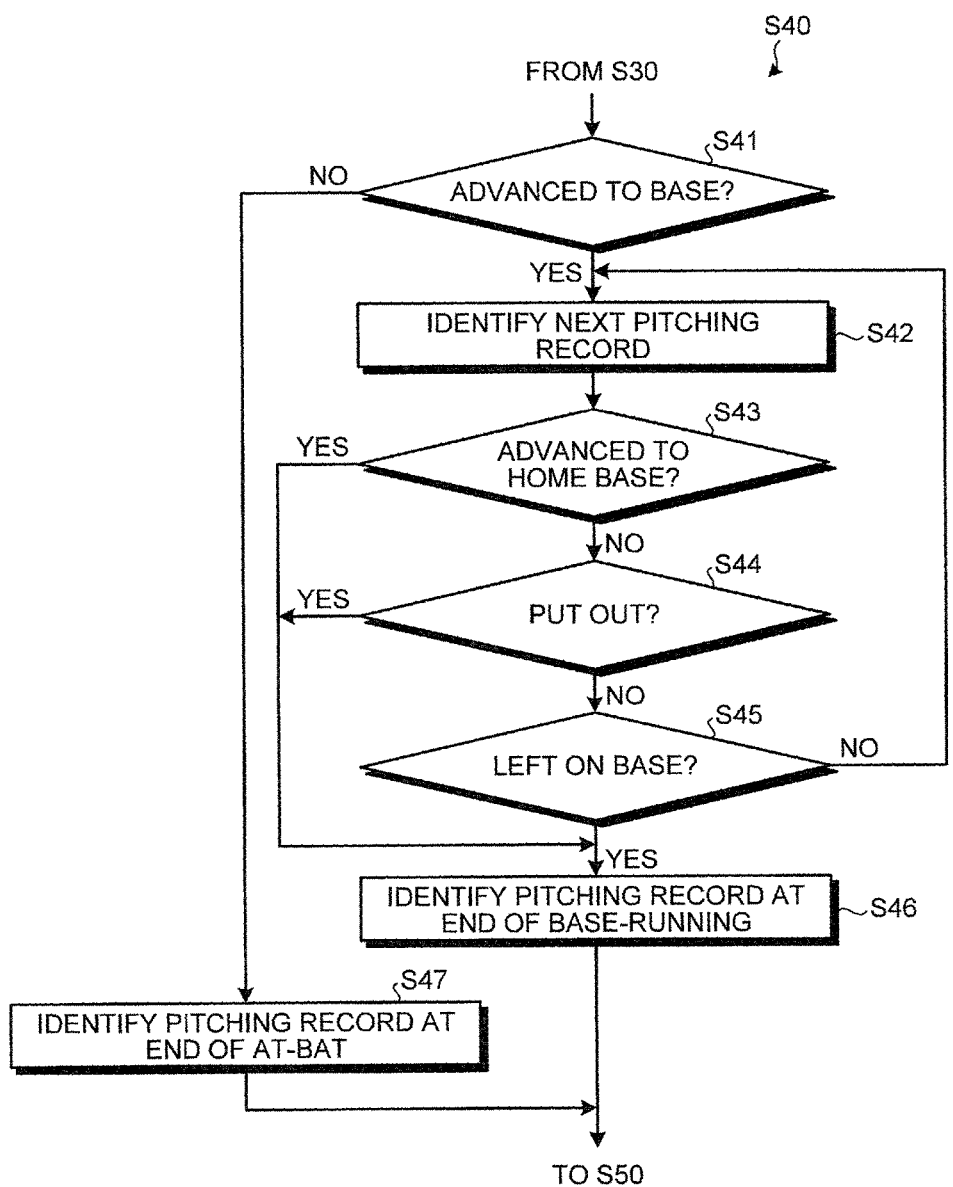
FIG. 8 is a flow chart illustrating an operation of the display device according to the present embodiment.

After the at-bat start record is identified, the end-of-play record identifying unit 57 identifies a pitching record which corresponds to the result of batting of the specific player or the result of base-running as the end-of-play record (FIG. 6, step S40). FIG. 8 is a flow chart illustrating the procedure of processing by the end-of-play record identifying unit 57 in step S40. As illustrated in FIG. 8, in step S40, the end-of-play record identifying unit 57 determines, based on the scorebook data, whether the specific player has advanced to a base in the at-bat the at-bat start record of which has been identified (step S41). In step S41, whether the on-base information 81 is "0" or "1" is detected for the last pitching record in the at-bat record including the at-bat start record. When the on-base information 81 is "1", the end-of-play record identifying unit 57 determines that the specific player has advanced to a base in the at-bat. When the on-base information 81 is "0", the end-of-play record identifying unit 57 determines that the specific player did not advance to a base in the at-bat.

For example, when the at-bat record D005 is identified in step S32, the end-of-play record identifying unit 57 detects, in step S41, that the on-base information 81 is "1" for the last pitching record A008 in the identified at-bat record D005. In this case, the end-of-play record identifying unit 57 determines that the player 005, who is the specific player, has advanced to a base in the at-bat.

When the specific player is determined to have advanced to a base in the at-bat (Yes in step S41), the end-of-play record identifying unit 57 identifies the next pitching record after the pitching record detected by the on-base information 81 (step S42).

The end-of-play record identifying unit 57 determines whether the specific player advanced to home base in the identified pitching record or not (step S43). In step S43, the end-of-play record identifying unit 57 checks, based on the scorebook data, whether there is a record of "home base" for the specific player who has advanced to a base, in the first base runner information 82, the second base runner information 83, or the third base runner information 84 of the runner score information 72. If there is a record of "home base" for the specific player, the end-of-play record identifying unit 57 determines that the specific player has advanced to home base in the identified pitching record. Also, if there is no record of "home base" for the specific player, the end-of-play record identifying unit 57 determines that the specific player did not advance to home base in the identified pitching record.

In the case of determining that the specific player did not advance to home base (No in step S43), the end-of-play record identifying unit 57 determines whether the specific player was put out in the pitching record identified in step S42 (step S44). In step S44, the end-of-play record identifying unit 57 checks, based on the scorebook data, whether there is a record of "out" for the specific player who has advanced to a base, in the first base runner information 82, the second base runner information 83, or the third base runner information 84 of the runner score information 72. If there is a record of "out" for the specific player, the end-of-play record identifying unit 57 determines that the specific player was put out in the identified pitching record. Also, if there is no record of "out" for the specific player, the end-of-play record identifying unit 57 determines that the specific player was not put out in the identified pitching record.

In the case of determining that the specific player was not put out (No in step S44), the end-of-play record identifying unit 57 determines whether the specific player was left on base in the pitching record identified in step S42 (step S45). In step S45, the end-of-play record identifying unit 57 checks, based on the scorebook data, whether there is a record of "1" for the specific player who has advanced to a base, in the first base runner information 82, the second base runner information 83, or the third base runner information 84 of the runner score information 72. If there is a record of "1" for the specific player, the end-of-play record identifying unit 57 determines that the specific player was left on base in the identified pitching record. Also, if there is no record of "1" for the specific player, the end-of-play record identifying unit 57 determines that the specific player was not left on base in the identified pitching record.

In the case of determining that the specific player was not left on base (No in step S45), the end-of-play record identifying unit 57 repeats the processes from step S42. In this case, the end-of-play record identifying unit 57 identifies, in step S42, the next pitching record after the pitching record for which it has been determined whether the player advanced to home base or not, whether the player was put out or not, and whether the player was left on base or not. Then, the end-of-play record identifying unit 57 repeats the processes from step S43 to S45 for the next pitching record.

When, as a result of determination, it is determined that the specific player has advanced to home base (Yes in step S43), or that the specific player was put out (Yes in step S44), or that the specific player was left on base (Yes in step S45), the end-of-play record identifying unit 57 identifies the pitching record as the end-of-play record (step S46).

Furthermore, in the case of determining, in step S41, that the specific player did not advance to a base in the at-bat (No in step S41), the end-of-play record identifying unit 57 identifies the last pitching record in the at-bat as the end-of-play record (step S47). After identifying the end-of-play record, the end-of-play record identifying unit 57 outputs an end-of-play record identifying signal to the displayed record setting unit 58.

For example, when the on-base information in the pitching record A008 is detected to be "1" in step S41, the end-of-play record identifying unit 57 identifies the pitching record A009 which is the next pitching record in step S42. Then, in step S43, the end-of-play record identifying unit 57 checks whether there is a record of "home base" in the first base runner information 82, the second base runner information 83, or the third base runner information 84 of the pitching record A009. Because there is no record of "home base", the end-of-play record identifying unit 57 determines that no player has advanced to home base (No in step S43). Next, in step S44, the end-of-play record identifying unit 57 checks whether there is a record of "out" in the first base runner information 82, the second base runner information 83, or the third base runner information 84 of the pitching record A009. Because there is no record of "out", the end-of-play record identifying unit 57 determines that the player was not put out (No in step S44). Furthermore, in step S45, the end-of-play record identifying unit 57 checks whether there is a record of "1" in the first base runner information 82, the second base runner information 83, or the third base runner information 84 of the pitching record A009. Because there is no record of "1", the end-of-play record identifying unit 57 determines that the player was not left on base (No in step S45).

Then, the end-of-play record identifying unit 57 performs determination in the same manner for the next pitching record A010 and the following pitching records. As a result, it is checked that there is a record of "home base" in the third base runner information 84 of the pitching record A018 (Yes in step S43). In this case, the end-of-play record identifying unit 57 identifies the pitching record A018 as the end-of-play record in step S46.

Figure 9:
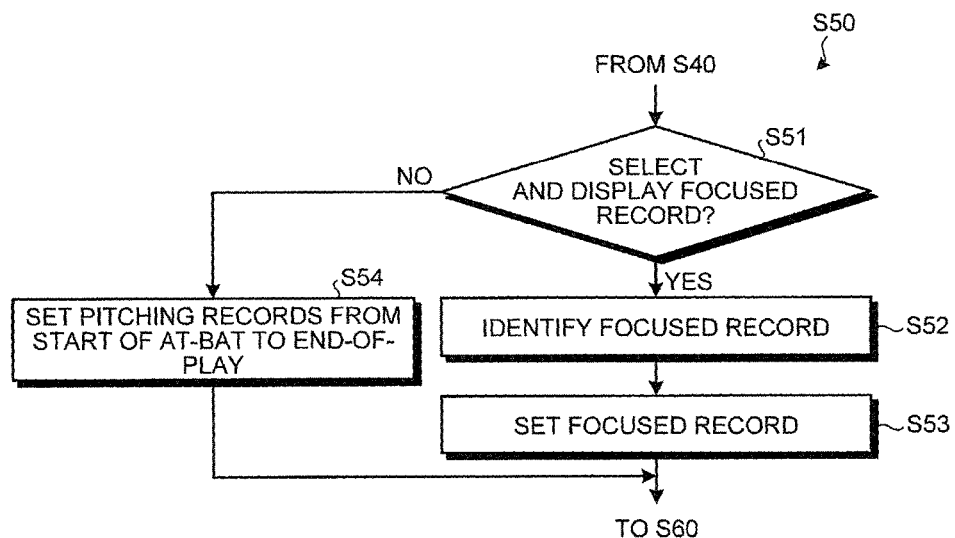
FIG. 9 is a flow chart illustrating an operation of the display device according to the present embodiment.

After the end-of-play record is identified, the displayed record setting unit 58 sets a displayed record (FIG. 6, step S50). FIG. 9 is a flow chart illustrating a procedure of processing by the displayed record setting unit 58 in step S50. As illustrated in FIG. 9, in step S50, the displayed record setting unit 58 determines whether to select and display a focused record or not (step S51). In step S51, the displayed record setting unit 58 determines to select and display a focused record when a focused record selection signal is input. When a focused record selection signal is not input, or an operation signal indicating that a focused record is not to be displayed is input, the displayed record setting unit 58 determines that a focused record is not to be selected and displayed. The displayed record setting unit 58 may cause the display 20 to display an operation screen for inputting an operation to display or not to display a focused record from the input unit 10, for example.

When it is determined in step S51 that a focused record is to be selected and displayed (Yes in step S51), the displayed record setting unit 58 identifies the focused record based on the scorebook data (step S52). In step S52, the displayed record setting unit 58 identifies, as the focused record, each pitching record included in the at-bat records among the pitching records from the at-bat start record to the end-of-play record. Also, when a specific player has advanced to a base in an at-bat, the displayed record setting unit 58 identifies the pitching record at the time when the score information of the specific player as a runner is changed as the focused record. After identifying the focused record, the displayed record setting unit 58 sets the identified focused record as the displayed record (step S53). In the case of setting a plurality of focused records as displayed records in step S53, the displayed record setting unit 58 separately sets each focused record as the displayed record.

Furthermore, in the case of determining in step S51 that a focused record is not to be selected and displayed (No in step S51), the displayed record setting unit 58 sets all the pitching records from the pitching start record to the end-of-play record as the displayed record (step S54). In step S54, the displayed record setting unit 58 collectively sets all the pitching records as one displayed record. The displayed record setting unit 58 outputs the set displayed record to the synchronization signal extraction unit 53.

An operation of identifying a focused record in a case where the pitching record A005 is set as the at-bat start record and the pitching record A018 is set as the end-of-play record will be described, for example. In this case, in step S52, the displayed record setting unit 58 sets each of the pitching records A005 to A008 included in the at-bat record D005 as the focused record. Also, because the specific player 005 is on base, the displayed record setting unit 58 detects the pitching record at the time when the score information of the specific player as a runner is changed. In this case, the displayed record setting unit 58 checks whether there is a record of "second base", "third base", "home base", or "out" in the first base runner information 82, the second base runner information 83, or the third base runner information 84 for each pitching record from the pitching record A009, which is the next pitching record after the pitching record A008 at the end of the at-bat, to the pitching record A018, which is an end-of-play record. When there is a record of any of "second base", "third base", "home base", and "out", the corresponding pitching record is identified as the focused record. In the example of the specific player 005, the pitching record A011, the first base runner information 82 of which includes a record of "second base", the pitching record A012, the second base runner information 83 of which includes a record of "third base", and the pitching record A018, the third base runner information 84 of which includes a record of "home base" are identified as the focused records. Then, the displayed record setting unit 58 sets each of the identified focused records as a displayed record R2. Additionally, when a focused record is not set, the displayed record setting unit 58 sets, in step S54, all the pitching records from the pitching record A005, which is an at-bat start record, to the pitching record A018, which is an end-of-play record, as a displayed record R1.

As illustrated in FIG. 6, after a displayed record is set, the synchronization signal extraction unit 53 extracts a synchronization signal (step S60). In step S60, the synchronization signal extraction unit 53 extracts a start time and an end time based on the displayed record. In the case where there is a plurality of displayed records, the synchronization signal extraction unit 53 extracts the start time and the end time for each displayed record. When the start time and the end time are extracted, the synchronization signal extraction unit 53 outputs the start time and the end time as a synchronization signal to the displayed video extraction unit 60 of the video data processor 52.

After the synchronization signal is extracted, the displayed video extraction unit 60 extracts a displayed video (step S70). In step S70, the displayed video extraction unit 60 extracts, based on the video data, scenes in the game video from the start time to the end time as a displayed video. When the displayed video is extracted, the displayed video extraction unit 60 outputs the displayed video as a displayed video display signal to the display 20. Moreover, the displayed video extraction unit 60 may output the displayed video display signal to the video storage processor 61 in step S70.

When the displayed video display signal is output, the display 20 displays the displayed video based on the displayed video display signal that is input (step S80). Accordingly, an at-bat video of the specific player as a batter in an at-bat corresponding to the selected score information, and, when the specific player advanced to base in the at-bat, a base-running video of the specific player as a runner are displayed on the display 20 as the displayed video.

For example, when the score card 22 of a batter E is selected from the electronic scorebook 21 in FIG. 10, an at-bat video 24*a* of an at-bat (at-bat record number D005) of the specific player (personal ID 005), who is the batter E, is displayed as a displayed video 24 as illustrated in FIG. 11. Also, in this case, because the specific player 005 has advanced to base in the at-bat, a base-running video 24*b* of the specific player as a runner is displayed as the displayed video 24 as illustrated in FIG. 12.

Additionally, as illustrated in FIGS. 11 and 12, the GUI image generation unit 55 may display a reduced image 25 of the electronic scorebook 21 on an area of the display 20 (in FIGS. 11 and 12, at the bottom left of the display 20). Also, if a touch operation is performed by the user on an area on which the reduced image 25 is superimposed on the input unit 10, the display on the display 20 may be switched to the image of the electronic scorebook 21.

Also, in step S51, when the displayed record setting unit 58 determines that a focused record is to be selected and displayed, a scene is displayed on the display 20, from the time corresponding to the start tag 85 to the time corresponding to the end tag 86 of each pitching record. Accordingly, even in a case of a video of continuous pitching records, the video may be viewed while skipping from the end of one pitching record to the start of the next pitching record. Therefore, the video of one specific player may be efficiently viewed.

Furthermore, when the displayed video extraction unit 60 outputs the displayed video display signal to the video storage processor 61 in step S70, the displayed video display signal is input to the video storage processor 61. When the displayed video display signal is input, the video storage processor 61 causes the extraction data storage unit 44 to store the displayed video. In this case, the video data of the displayed video 24 is stored in the extraction data storage unit 44. Therefore, the video of a focused specific player may be extracted from the game video, and be stored in the storage 40.

As described above, the display device 100 according to the present embodiment causes the display 20 to display the electronic scorebook 21, extracts from the game video, when a score selection signal is output from the input unit 10, the displayed video 24 including the at-bat video 24*a* of the specific player as a batter at an at-bat corresponding to the selected score information and the base-running video 24*b* of the specific player as a runner when the specific player advanced to base in the at-bat, and causes the display 20 to display the displayed video 24. Accordingly, when displaying a baseball game video, the display device 100 may allow display focusing on play of a specific player from the start of an at-bat to the end of base-running.

According to the present disclosure, there may be provided a display device, a display method, and a non-transitory storage medium which stores a program, which are capable of performing display focusing on play of a specific player in an inning from the start of at-bat to the end of base-running on displaying a baseball game video.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
   a display;
   a storage configured to store a game video of a game of baseball captured in advance and scorebook data corresponding to the game; and
   a controller configured to extract from the game video, when score information of a specific player included in the scorebook data is selected, a displayed video including an at-bat video of the specific player in an at-bat related to the selected score information, and when the specific player advanced to base, also a base-running video of the specific player related to the selected score information as a runner in the at-bat to cause the display to display the displayed video,
   wherein the game video is constituted of a plurality of scenes starting from a pitch, and
   the controller is further configured to extract the game video from start of a first scene of the at-bat to an end of a last scene of the at-bat as the at-bat video from the game video when the specific player did not advance to base, and
   when the specific player advanced to base, also extracts the game video from a scene after advancing to base of the specific player to an end of a last scene of base-running of the specific player as the base-running video from the game video.

2. The display device according to claim 1, wherein the base-running video is a scene where the score information of the specific player advanced to base as a runner is changed after advancing to base.

3. The display device according to claim 1, wherein the controller is further configured to cause the storage to store the displayed video.

4. A display method for causing a display device, including a controller configured to execute computer executable instructions to perform processes, a display, a storage configured to store computer executable instructions, a game video of a game of baseball captured in advance and scorebook data corresponding to the game, to display a displayed video, the processes comprising:
   extracting from the game video, when score information of a specific player included in the scorebook data is selected, the displayed video including an at-bat video of the specific player in an at-bat related to the selected score information, and when the specific player advanced to base, also a base-running video of the specific player related to the selected score information as a runner in the at-bat, and
   causing the display to display the displayed video,
   wherein the game video is constituted of a plurality of scenes starting from a pitch, and
   the processes further comprise:
   extracting the game video from start of a first scene of the at-bat to an end of a last scene of the at-bat as the at-bat video from the game video when the specific player did not advance to base,
   and when the specific player advanced to base, also extracting the game video from a scene after advancing to base of the specific player to an end of a last scene of base-running of the specific player as the base-running video from the game video.

5. A non-transitory storage medium which stores a display program for causing a display device, including a controller configured to execute computer executable instructions to perform processes, a display, a storage configured to store the computer executable instructions, a game video of a game of baseball captured in advance and scorebook data corresponding to the game, to display a displayed video, the display program being configured to cause the display device to perform the processes of:
   extracting from the game video, when score information of a specific player included in the scorebook data is selected, the displayed video including an at-bat video of the specific player in an at-bat related to the selected score information, and when the specific player advanced to base, also a base-running video of the specific player related to the selected score information as a runner in the at-bat, and
   causing the display to display the displayed video,
   wherein the game video is constituted of a plurality of scenes starting from a pitch, and
   the display program is further configured to cause the display device to perform processes of:

extracting the game video from start of a first scene of the at-bat to an end of a last scene of the at-bat as the at-bat video from the game video when the specific player did not advance to base, and when the specific player advanced to base, also extracting the game video from a scene after advancing to base of the specific player to an end of a last scene of base-running of the specific player as the base-running video from the game video.

6. A display device comprising:

a display;

a storage configured to store a game video of a game of baseball captured in advance and scorebook data corresponding to the game; and a controller configured to extract from the game video, when score information of a specific player included in the scorebook data is selected, a displayed video including an at-bat video of the specific player in an at-bat related to the selected score information, and when the specific player advanced to base, also a base-running video of the specific player related to the selected score information as a runner in the at-bat to cause the display to display the displayed video, wherein the storage is further configured to store synchronization information associating the video data with the scorebook data, and the synchronization information associates a start time of pitching and an end time of pitching in each pitch in the scorebook data with a start scene of the pitching and a last scene of the pitching in the video data respectively.

7. The display device according to claim 6, wherein the base-running video is a scene where the score information of the specific player advanced to base as a runner is changed after advancing to base.

8. The display device according to claim 6, wherein the controller is further configured to cause the storage to store the displayed video.

9. A display method for causing a display device, including a controller configured to execute computer executable instructions to perform processes, a display, a storage configured to store computer executable instructions, a game video of a game of baseball captured in advance and scorebook data corresponding to the game, to display a displayed video, the processes comprising:

extracting from the game video, when score information of a specific player included in the scorebook data is selected, the displayed video including an at-bat video of the specific player in an at-bat related to the selected score information, and when the specific player advanced to base, also a base-running video of the specific player related to the selected score information as a runner in the at-bat, and causing the display to display the displayed video, wherein the storage is further configured to store synchronization information associating the video data with the scorebook data, and the synchronization information associates a start time of pitching and an end time of pitching in each pitch in the scorebook data with a start scene of the pitching and a last scene of the pitching in the video data respectively.

10. A non-transitory storage medium which stores a display program for causing a display device, including a controller configured to execute computer executable instructions to perform processes, a display, a storage configured to store the computer executable instructions, a game video of a game of baseball captured in advance and scorebook data corresponding to the game, to display a displayed video, the display program being configured to cause the display device to perform the processes of:

extracting from the game video, when score information of a specific player included in the scorebook data is selected, the displayed video including an at-bat video of the specific player in an at-bat related to the selected score information, and when the specific player advanced to base, also a base-running video of the specific player related to the selected score information as a runner in the at-bat, and causing the display to display the displayed video, wherein the storage is further configured to store synchronization information associating the video data with the scorebook data, and the synchronization information associates a start time of pitching and an end time of pitching in each pitch in the scorebook data with a start scene of the pitching and a last scene of the pitching in the video data respectively.

* * * * *